United States Patent [19]
Kakuno et al.

[11] Patent Number: 5,960,165
[45] Date of Patent: Sep. 28, 1999

[54] IMAGE FORMING METHOD AND IMAGE FORMING APPARATUS

[75] Inventors: Norishige Kakuno; Hikonosuke Uwai, both of Nagano, Japan

[73] Assignee: Seiko Epson Corporation, Tokyo, Japan

[21] Appl. No.: 08/878,607

[22] Filed: Jun. 19, 1997

[30] Foreign Application Priority Data

Jun. 19, 1996 [JP] Japan .................................. 8-158673
Apr. 2, 1997 [JP] Japan .................................. 9-084246

[51] Int. Cl.[6] ............................ G06T 15/00; G05B 11/00
[52] U.S. Cl. ............................ 395/111; 395/114; 395/113; 395/117
[58] Field of Search .................................. 395/101, 102, 395/103, 106, 107, 111, 113, 114, 115, 117, 112, 116

[56] References Cited

U.S. PATENT DOCUMENTS

| | | | |
|---|---|---|---|
| 4,843,405 | 6/1989 | Morikawa et al. | 346/1.1 |
| 5,136,688 | 8/1992 | Morikawa et al. | 395/115 |
| 5,191,430 | 3/1993 | Sudoh et al. | 358/296 |
| 5,333,246 | 7/1994 | Nagasaka | 395/115 |
| 5,487,137 | 1/1996 | Matsuhira | 395/115 |
| 5,511,156 | 4/1996 | Nagasaka | 345/433 |
| 5,652,889 | 7/1997 | Sites | 395/708 |
| 5,680,521 | 10/1997 | Pardo et al. | 395/112 |

*Primary Examiner*—David K. Moore
*Assistant Examiner*—Douglas Q. Tran
*Attorney, Agent, or Firm*—Sughrue, Mion, Zinn, Macpeak & Seas, PLLC

[57] ABSTRACT

An intermediate code generating section generates intermediate codes corresponding to a print job on a rectangular block basis, the print job being received by a receiving section, arranges the intermediate codes generated on a rectangular block basis either in a lengthwise direction or in a widthwise direction of a page, and stores the arranged intermediate codes on a band basis in an intermediate code memory, the rectangular block being a square. An actual image data generating section generates actual image data by extracting the intermediate codes on a band basis from the intermediate code memory. In generating the actual image data, if the initially set direction of a page is changed, a direction in which to generate bits forming an intermediate code within each rectangular block having been generated is rotated by 90° and rectangular blocks, each forming an intermediate code, are extracted on a band basis, the band extending in the other direction of the page.

9 Claims, 6 Drawing Sheets

← : SHEET FORWARD DIRECTION

FIG. 6 (a)  A ⇒ B
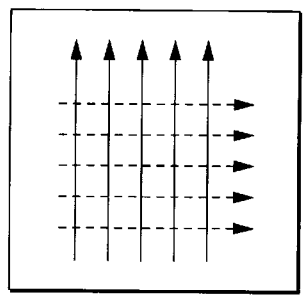
FIG. 6 (b)  A ⇒ D
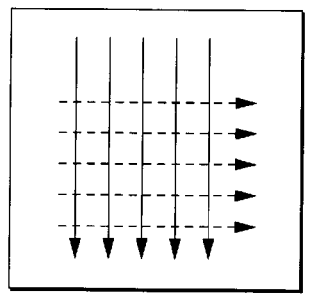
FIG. 6 (c)  B ⇒ A
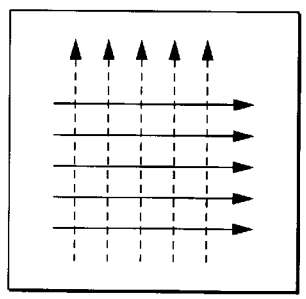
FIG. 6 (d)  D ⇒ C
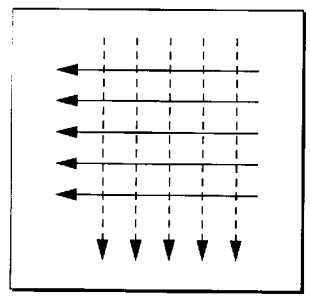
FIG. 7
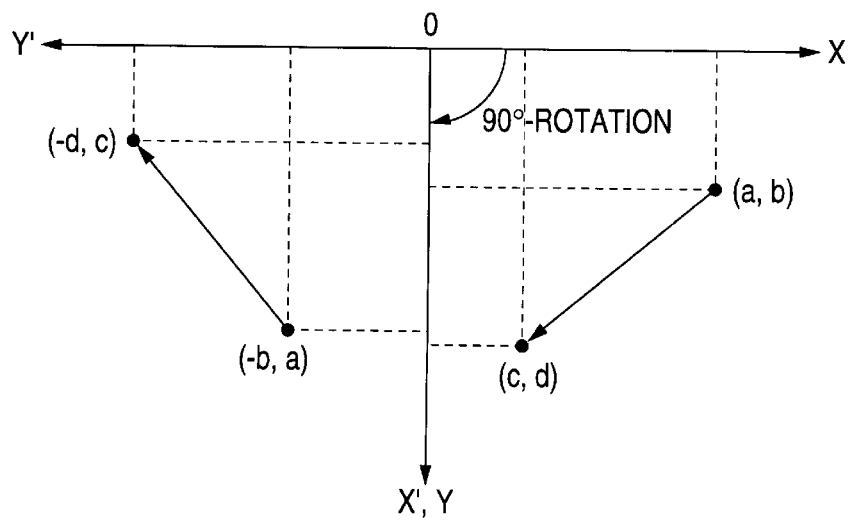

IMAGE FORMING METHOD AND IMAGE FORMING APPARATUS

BACKGROUND OF THE INVENTION

1. Field of the Invention

The present invention relates to an image forming apparatus that forms an image by not only generating intermediate codes per predetermined virtual band size but also converting the generated intermediate codes into actual image data. More particularly, the present invention is directed to a method of handling intermediate codes.

2. Description of the Prior Art

A page printer is known as an image forming apparatus that forms an image based on print data in a print job. The page printer not only stores print data by once compressing the print data into intermediate codes but also develops the stored intermediate codes into a bit image (hereinafter referred to as the "actual image data"), so that an image is formed in a page unit based on such actual image data.

In a page printer of this type, a memory such as a RAM has at least a first memory area and a second memory area. The first memory area serves to store intermediate codes, and the second memory area serves to store actual image data obtained by developing the intermediate codes within the first memory area. An image is formed by reading the actual image data within the second memory whenever appropriate.

The intermediate code includes, e.g., position information for page-unit print data and image information (expressed in the form of bit map data or functional data) at such position. The reasons why the print data is converted into intermediate codes once are because the image forming operation becomes complicated and time-consuming when actual image data is generated directly from the print data and because the intermediate codes are smaller in size than the actual image data when stored. However, some print data has voluminous position information and image information of characters and graphics, and there is a case where the size of intermediate codes is larger than the size of actual image data. In this case, sometimes performed within the printer apparatus is the operation of developing intermediate codes stored in the first memory area into actual image data, compressing the developed actual image data, and storing the compressed data.

By the way, in the conventional page printer, a single page is often divided into a plurality of virtual bands in order to minimize the size of the second memory area, and intermediate codes within each virtual band are sequentially subjected to a cyclic process using a plurality of physical bands on the second memory area. That is, an individual page is divided into, e.g., a plurality of virtual bands, each virtual band extending in a direction uniquely defined by the laser scanning operation performed by the engine of the printing mechanism; intermediate codes are generated on a virtual band basis; and the generated intermediate codes are sequentially stored in the first memory area. Then, the intermediate codes of each virtual band are developed into actual image data; the developed actual image data are stored in the second memory area; the actual image data being sequentially stored are sent to the printing mechanism in accordance with the capacity of the printing mechanism; and the sent data is printed. The number of bands is determined by the capacities of the first and second memory areas and the size of a page.

As described above, in the conventional page printer, a page is divided into a plurality of virtual bands extending in a single direction and intermediate codes are generated and stored for every virtual band. Therefore, unless the specified sheet direction correctly matches the sheet direction actually set in a sheet feed tray, an error message is displayed on a printer panel or the like and the operator is prompted to either change the sheet arranging direction or select a correct sheet feed tray. This is because it is easier to change the sheet arranging direction than change the image forming direction since intermediate code regeneration entails greater time and memory capacity.

However, this technique requires the operator to take the action of changing the sheet feed tray or sheet arranging direction, which in turn impairs operability. This problem is commonly encountered by apparatuses that form an image by generating intermediate codes for a predetermined size such as page printers, and an improvement has been called for.

SUMMARY OF THE INVENTION

The object of the present invention is therefore to provide image forming technology that allows lengthwise and widthwise directions of an image forming area to be switched with ease, so that the image forming operation is not restricted by the direction of sheets set in a sheet feed tray.

There is provided an image forming method according to the present invention comprising the steps of: generating intermediate codes corresponding to a print job on a rectangular block basis; arranging a plurality of rectangular blocks of the intermediate codes in either a lengthwise direction or a widthwise direction of an image forming area so as to construct a virtual band having a predetermined width and extending in one direction either of the lengthwise direction or a widthwise direction; developing the intermediate codes into bit images on a virtual band basis so as to form an image; and reconstructing the virtual band so as to extend in the other direction by changing a direction in which to generate bits forming the intermediate code within each rectangular block when a direction of the image forming area is changed to the other direction thereof.

It is preferred that each rectangular block be a square and that the origin of the address of each rectangular block be set to the center of the square. The reason therefor is that if each rectangular block is an oblong and if the origin of the address of each rectangular block is set to such a position as shown in FIG. 8(a), when the direction in which to generate a bit array expressing an actual image component is rotated by 90°, the coordinates of the intermediate code generated as a result of the rotation are disadvantageously located totally out of range of the initially allocated rectangular block. Further, even if the origin of the address of each rectangular block is set to such a position as shown in FIG. 8(b), when the direction in which to generate a bit array expressing an actual image component is rotated by 90°, the coordinates of the intermediate code generated as a result of the rotation are located partially out of range of the initially allocated rectangular block, disadvantageously invading into adjacent rectangular blocks. As a result, in both cases FIGS. 8(a) and 8(b), it is required to perform the operation of checking to which rectangular block each intermediate code belongs for all the intermediate codes. This entails additional memory and time.

In contrast thereto, if each rectangular block is a square, even if the direction in which to generate a bit array expressing an actual image component is rotated by 90°, newly generated intermediate codes are all located within the initially allocated rectangular block as shown in FIG.

8(c). Therefore, it is not necessary to perform the operation of checking to which rectangular block each intermediate code belongs. Hence, to form each rectangular block into a square and to set the origin of the address of each rectangular block at the center of the square at the time of generating intermediate codes is extremely advantageous in terms of memory and time compared with each rectangular block being an oblong.

Further, if each rectangular block is a square, the length of a side of the square is set so as to be equal to a shorter side of the virtual band. As a result, one virtual band can be formed by grouping a plurality of rectangular blocks in such a manner that the plurality of rectangular blocks are arranged in an array extending in a single direction (either in a lengthwise direction or in a widthwise direction).

Further, there is provided an image forming apparatus according to the present invention comprising: first means for generating intermediate codes corresponding to a print job on a rectangular block basis and grouping the intermediate codes within the respective generated rectangular blocks by arranging the intermediate codes in one direction either of a lengthwise direction or a widthwise direction; second means for forming an image by developing the generated intermediate codes into a bit image per group; and third means for changing a direction in which to generate bits forming the intermediate code within each rectangular block to the other direction either of the lengthwise direction or the widthwise direction upon reception of an instruction.

It may be noted that the aforementioned image forming apparatus may be implemented through cooperation of a computer and an instruction carrying body that adds a function to the computer. The instruction carrying body in this case is constructed of the first to the fourth means in such a manner that the computer can read a plurality of instruction forming bodies formed on the computer.

BRIEF DESCRIPTION OF THE DRAWINGS

In the accompanying drawings:

FIG. 5(a) shows a condition before change, and FIGS. 5(b) and 5(c) show conditions after change;

FIGS. 6(a) to 6(d) are diagrams illustrative of processes performed by a rotator, FIG. 6(a) a change to a sheet forward direction B from a sheet forward direction A in FIG. 2, FIG. 6(b) a change to a sheet forward direction D from the sheet forward direction A, FIG. 6(c) a change to the sheet forward direction A from the sheet forward direction B; and FIG. 6(d) a change to a sheet forward direction C from the sheet forward direction D;

FIG. 7 is a diagram illustrative of rotation of an intermediate code by 90°; FIGS. 8(a) and 8(b) show an example in which a rectangular block is oblong, FIG. 8(c) shows an example in which a rectangular block is square and the center of the square block is used as the origin for generating an intermediate code.

DETAILED DESCRIPTION OF THE PREFERRED EMBODIMENT

A mode of embodiment of the present invention will now be described in detail with reference to the drawings.

Figure 1:
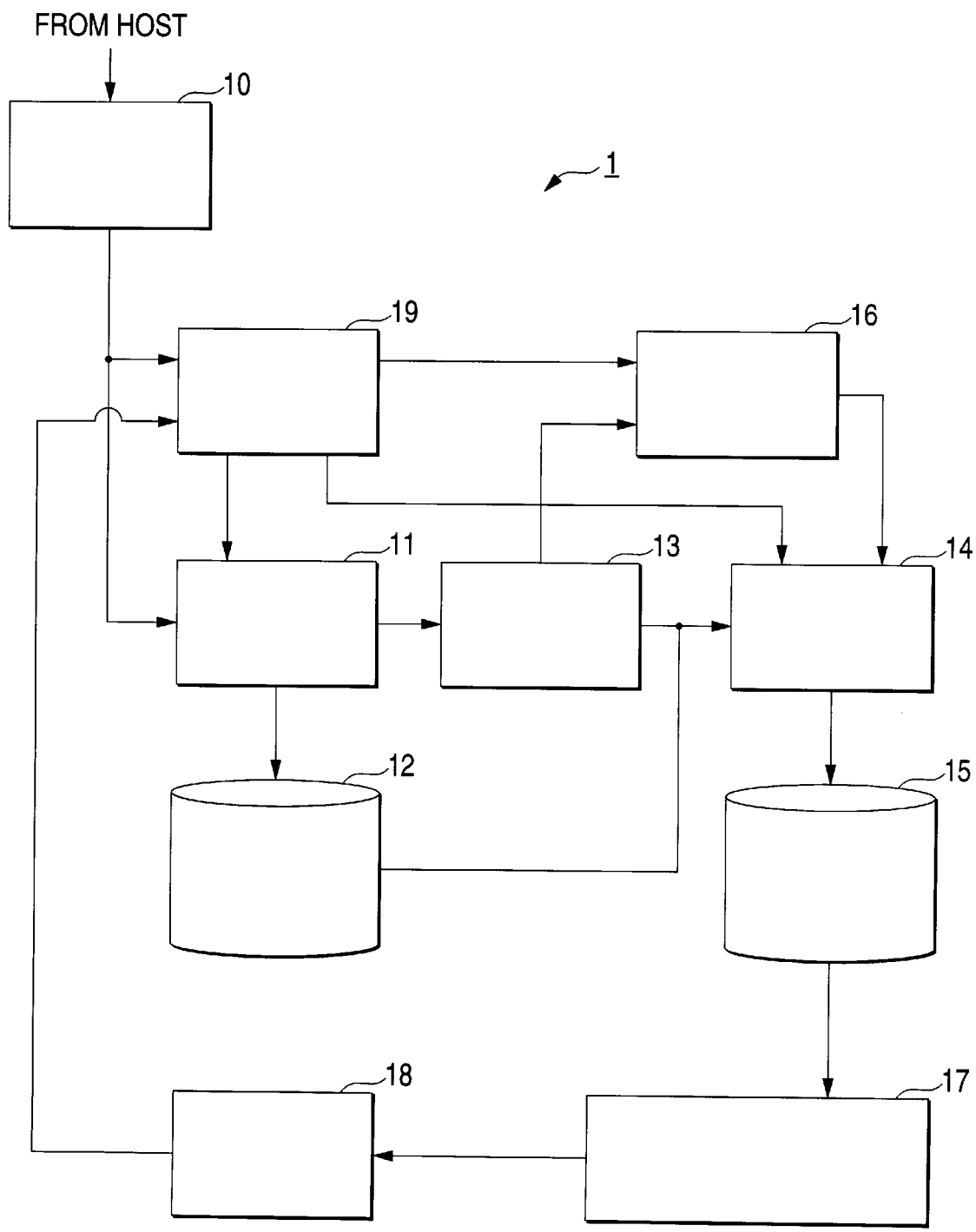
FIG. 1 is a block diagram showing a configuration of a page printer, which is a mode of embodiment of the present invention.

FIG. 1 is a block diagram showing a mode of embodiment in which the present invention is applied to a laser page printer. This page printer 1 includes: a receiving section 10 having an input port for inputting print data received from an external unit such as a host computer (hereinafter referred to as the "host") and a print data memory that temporarily stores the inputted print data; and an image forming processing section arranged in the latter stage of the receiving section 10. That is, the image forming processing section includes: an intermediate code generating section 11; an intermediate code memory 12; a grouping information managing section 13; an actual image data generating section 14; a band memory 15; a rotator 16; a printing mechanism 17 that supports both lengthwise arrangement and widthwise arrangement as sheet arranging directions; a sheet direction detecting section 18 that detects a change in the sheet arranging direction in the printing mechanism 17; and a main control section 19 that supervises control within the printer.

Functional sections other than the input port in the receiving section 10 and the hardware in the printing mechanism 17 can be implemented by software. Further, the functions performed by the software can be implemented through cooperation of an instruction forming body (such as a program) and a computer having the functions added thereto by such instruction forming body, the instruction forming body being physically implemented on a transportable medium that can be read by the computer.

The rotator 16 rotates the direction of a bit array forming an intermediate code by 90° by a bit operation. This process will be described with reference to FIG. 7. By the "90°-rotation" it is intended to mean a process that converts coordinates (a, b) into coordinates (−b, a) when the process is expressed in terms of coordinates. By rotating the direction in which to generate a bit array that expresses an actual image component by 90° it is intended to mean a process that converts all the values from (a, b) to (−b, a) when all the intermediate codes are expressed in the form of a bit map and a process that converts into line (−b, a) (−d, c) when an intermediate code is expressed, e.g., in the form of a line (a, b) (c, d). The rotator 16 may be constructed of a board or the like, and mounting thereon a dedicated circuit such as an operation circuit, or as a part of software functions within the main control section 19. In the former case, processing speed may be relatively increased since it is the dedicated hardware function that performs the operation. Further, in the latter case, it is advantageous if a command for rotating an intermediate code by 90° is added in the intermediate code itself. The sheet direction detecting section 18 may be added to the main control section 19 in the form of a module.

Figure 2:
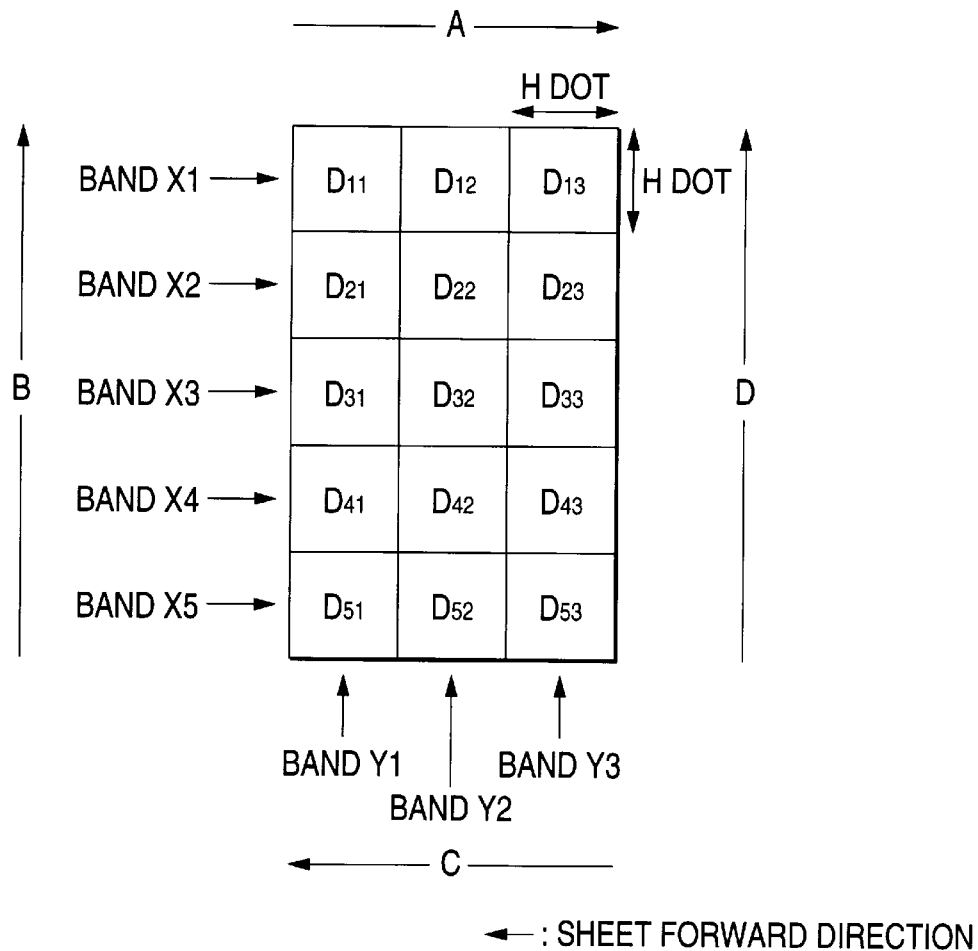
FIG. 2 is a diagram showing an example of rectangular block-based intermediate codes generated by the present mode of embodiment.

The receiving section 10 not only sends a print job and print data sent from the host to the intermediate code generating section 11, but also informs the main control section 19 to the same effect. The intermediate code generating section 11 generates intermediate codes corresponding to the print data on a rectangular block basis and stores the generated intermediate codes in the intermediate code memory 12. In this case, the generated rectangular block-based intermediate codes are grouped so as to form an array either in the lengthwise direction or in the widthwise direction, so that a virtual band can be constructed. FIG. 2 shows an example of such grouping. Reference characters D11 to D52 denote intermediate codes formed on a rectangular block basis.

In the example shown in FIG. 2, if a sheet is arranged in the lengthwise direction (in a sheet forward direction A), the intermediate code generating section 11 groups the intermediate codes D11, D12, D13, D21, D22, D23, and so on to construct virtual bands X1, X2, ... X5. On the other hand, if a sheet is arranged in the widthwise direction (in a sheet forward direction B), the intermediate code generating section 11 groups the intermediate codes D51, D41, D31, D21, D11, and so on to construct virtual bands Y1, Y2, Y3. It may be noted that if a sheet is arranged upside down in the lengthwise direction (in a sheet forward direction C), the virtual bands are constructed in the order of X5, X4, ... with the intermediate codes grouped as D53, D52, D51, and so on. It may also be noted that if a sheet is arranged upside down in the widthwise direction (in a sheet forwarding direction D), the virtual bands are constructed in the order of Y3, Y2, Y3 with the intermediate codes grouped as D13, D23, D33, D43, D53 and so on.

Each of the rectangular blocks D11 to D53 according to the present mode of embodiment is a square having the same area. The length (H dots) of a side of the square coincides with the length of a short side of each of the virtual bands X1 ... X5 or Y1 ... Y3. The reason why the square is selected as the shape is to facilitate the rotation of the direction in which to generate the bit array of an intermediate code by 90° as will be described later.

Figure 3:
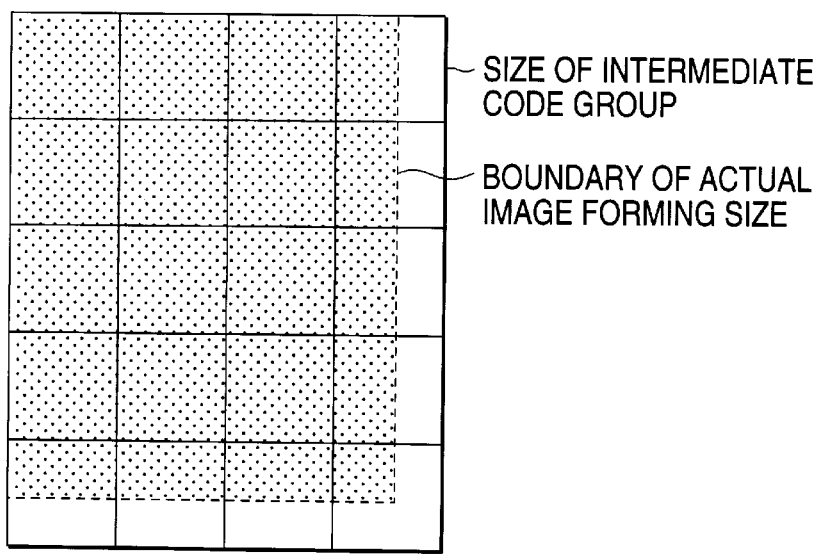
FIG. 3 is a diagram illustrative of a relationship between a virtual image forming space formed by a group of square intermediate code blocks and an actual image forming size indicated by a broken line.

It may be noted that when each rectangular block is formed into a square, the size of an actual image that can be formed by an engine may, in some cases, be different from a virtual image forming space that is prepared by these blocks. FIG. 3 shows this condition. In FIG. 3, a broken line indicates the boundary of the actual image forming size, which is smaller than that of the virtual image forming space. In this case, an unnecessary portion is clipped, i.e., cut out on the band memory 15 that generates actual image data, which will be described later. As a result, the remaining actual image data is sent to the engine of the printing mechanism 17. The same applies whether a sheet is arranged in the lengthwise direction or in the widthwise direction. Even in this case, the number of blocks, each forming an intermediate code, is 5×4=20 in the example shown in FIG. 3.

When generating intermediate codes and storing the generated intermediate codes in the intermediate code memory 12 in the aforementioned manner, the intermediate code generating section 11 stores grouping information in the grouping information managing section 13, the grouping information being obtained by grouping the rectangular block-based intermediate codes. This grouping information managing section 13 includes: a matrixlike address storage table indicating, e.g., an arrangement of intermediate codes D11 to D53 shown in FIG. 2; and a search engine for such address storage table. Rectangular block arranging information on a band basis may also be stored in the form of a list in place of the address storage table.

The actual image data generating section 14 generates actual image data by developing intermediate codes from the intermediate code memory 12 on a virtual band basis and stores the generated actual image data in the band memory 15. How the generated actual image data is stored is as described above. The printing mechanism 17 actually prints data on a sheet based on the actual image data within the band memory 15.

A specific operation of the thus constructed page printer 1 according to the present mode of embodiment will be described next with reference to FIGS. 4 to 6.

Figure 4:
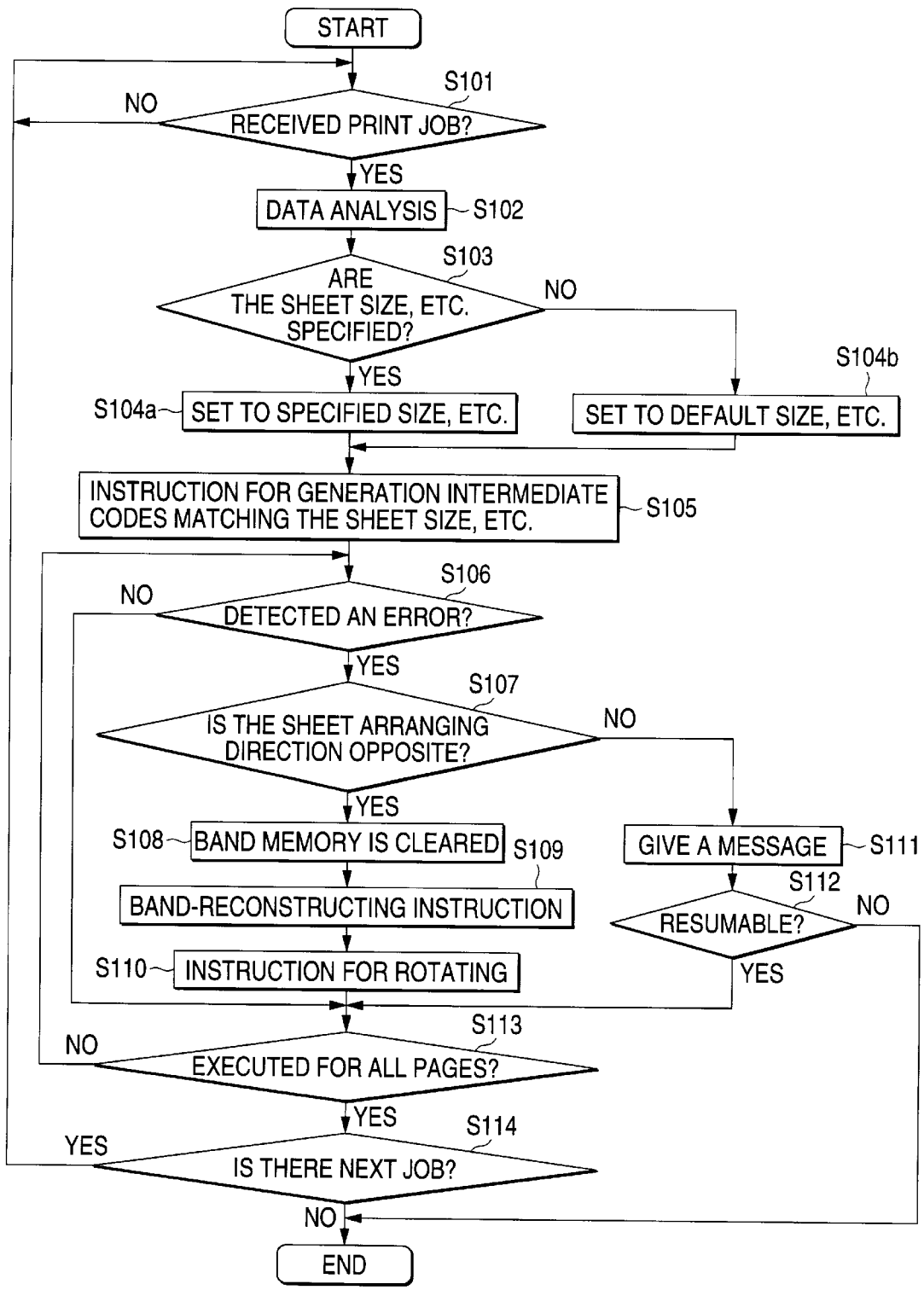
FIG. 4 is diagram illustrative of a control procedure followed by a main control section in the page printer according to the present mode of embodiment.
Figure 5:
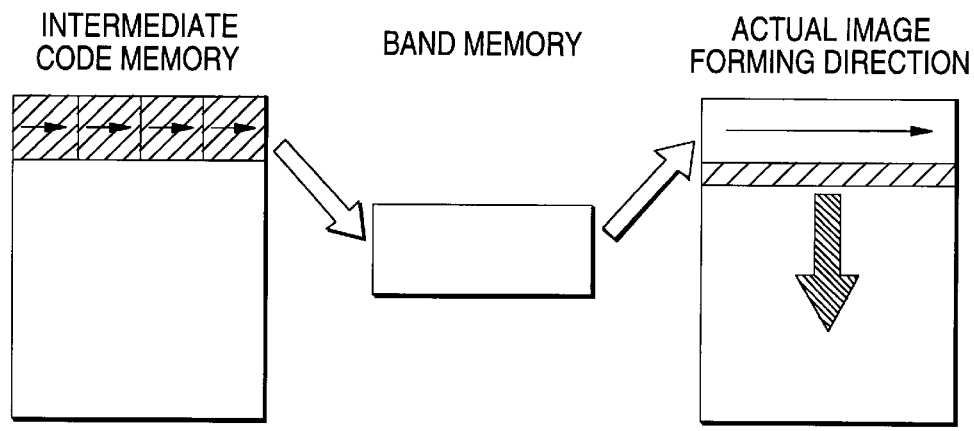
FIGS. 5(a) to 5(c) are diagrams illustrative of processes before and after a sheet forward direction is changed.
Figure 5:
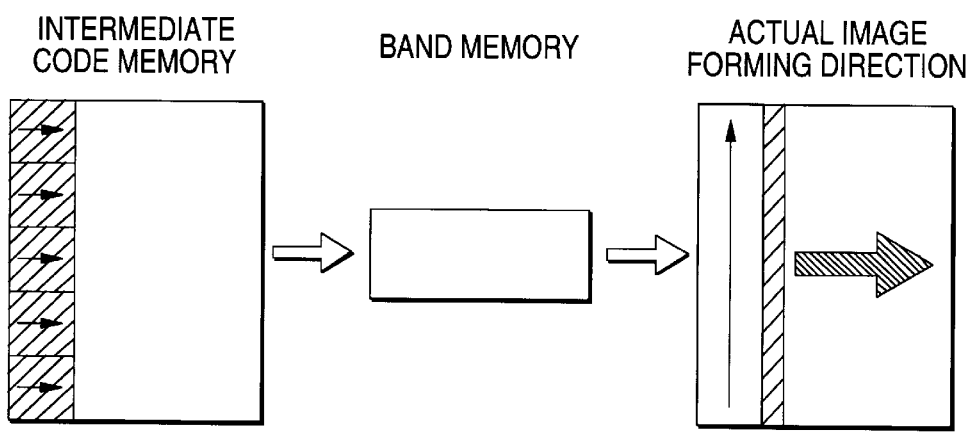
Figure 5:
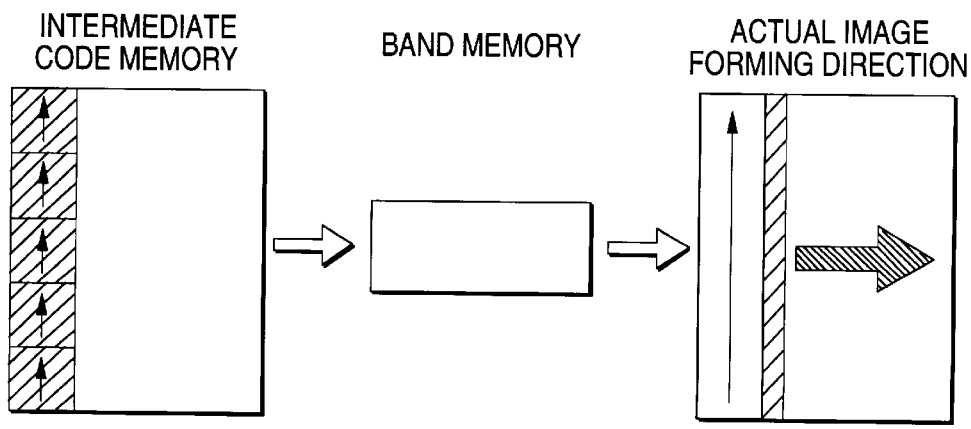
Figure 8:
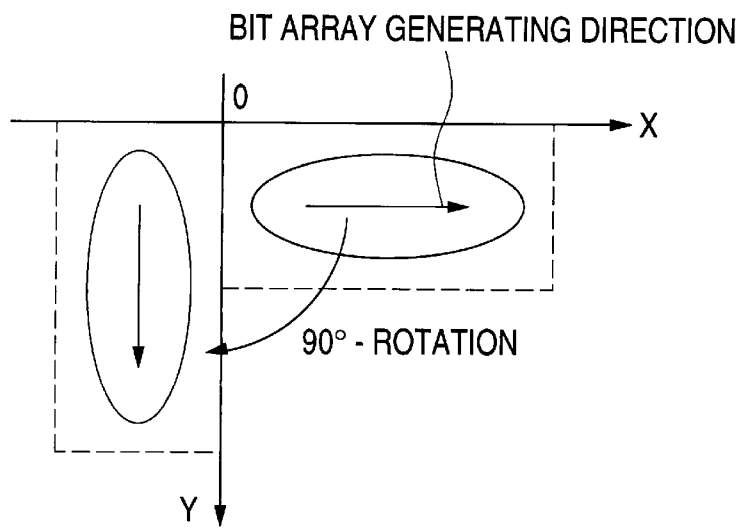
FIGS. 8(a) to 8(c) are diagrams showing a result when the direction of a bit array representing an actual image component is changed.
Figure 8:
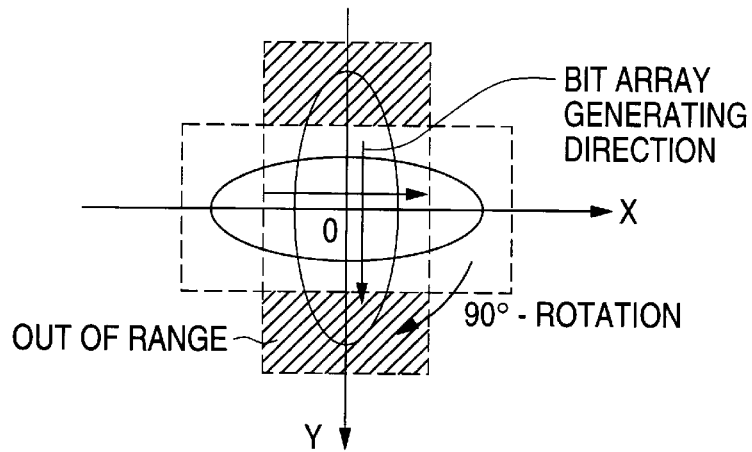
Figure 8:
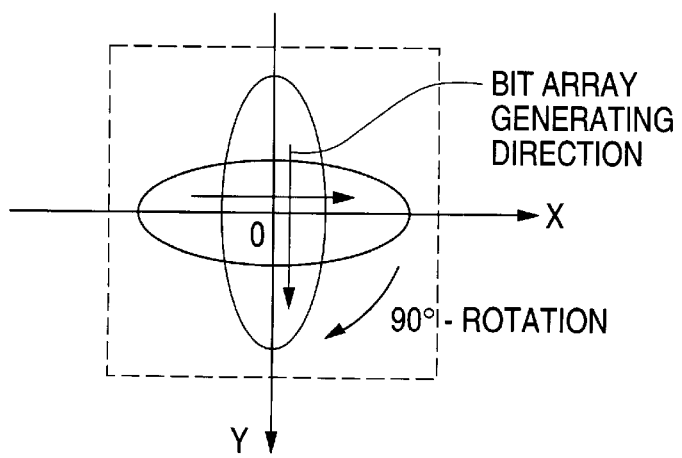

FIG. 4 is a diagram illustrative of a control procedure to be followed by the main control section 19. When the receiving section 10 has detected the reception of a print job (S101), the main control section 19 analyses necessary data included in the print job (S102). Then, whether or not the sheet size and the sheet direction (hereinafter referred to as the "sheet size, etc.") are specified in the result of the analysis is judged (S103). If there are such specifications (S103: Yes), the sheet size, etc. of the image forming processing system, i.e., the shape, etc. of the image forming area (page) are set as specified (S104a). On the other hand, if there are not such specifications (S103: No), the sheet size, etc. are set to default values (S104b).

After the sheet size, etc. have been set, an instruction for generating intermediate codes matching the sheet size, etc. is given to the intermediate code generating section 11 (S105). As a result, intermediate codes are generated in a page unit, and in association therewith, the operation of generating actual image data and printing the generated actual image data onto a sheet and a like operation are performed. That is, not only the intermediate codes are generated on a rectangular block basis by the intermediate code generating section 11 and the generated intermediate codes are sequentially stored in the intermediate code memory 12 in accordance with the sheet size, but also the intermediate codes generated on a rectangular block basis are grouped and the grouping information is stored in the grouping information managing section 13. The actual image data generating section 14 generates actual image data by extracting the intermediate codes (i.e., by moving the data) on a band basis from the intermediate code memory 12 and the extracted data is sequentially stored in the band memory 15. The printing mechanism 17 extracts the actual image data (moves the data) from the band memory 15 and prints the extracted data onto a sheet.

The main control section 19 monitors whether or not an error has occurred during the image forming process with a not shown monitor means at all times (S106). When the main control section 19 has detected an error, the cause of the error is judged. That is, if the main control section 19 has detected an error (S106: Yes), the main control section 19 judges whether or not the sheet arranging direction is opposite from what it should be from the information inputted from the sheet direction detecting section 18 (S107). If the sheet arranging direction is opposite (S107: Yes), not only the band memory 15 having the actual image data stored for such page is cleared (S108), but also a band-reconstructing instruction is outputted (S109). Specifically, e.g., an instruction for changing the order of extracting the intermediate codes from the intermediate code memory 12 is given to the actual image data generating section 14 by the grouping information managing section 13. In addition, an instruction for rotating the direction of the intermediate codes is given to the rotator 16 (S110).

As a result, the actual image data generating section 14 changes the order of extracting the rectangular block-based intermediate codes by referring to the grouping information, and reconstructs the groups, i.e., reconstructs the bands. For instance, in the example shown in FIG. 2, if the sheet forward direction is changed from A to B, the order of extracting the rectangular block-based intermediate codes that have been extracted in the order of D11, D12, D13, D21, D22, . . . is changed into the order of D51, D41, D31, D21, D11, D52, D42, . . . , and the actual image data is regenerated in this order and restored in the band memory 15. FIG. 5(a) is a diagram illustrative of a relationship among the intermediate code memory 12, the band memory 15 (actual image forming physical memory), and the actual image forming direction on a sheet before the extracting order is changed; FIGS. 5(b) and (c) are diagrams illustrative of such relationship after the extracting order has been changed. Each shaded portion in the intermediate code memory 12 indicates an example of a single band. Further, the direction (main scanning direction) in which to form an actual image on a sheet by laser beam scanning is indicated by a slender arrow, whereas the sheet forward direction (auxiliary scanning direction) is indicated by a thick arrow.

By the way, the direction of bits forming an intermediate code within each rectangular block, i.e., the direction in which to generate a bit array representing each actual image component remains unchanged after the process shown in FIG. 5(b) has been completed. Since such bit direction crosses the actual image forming direction (main scanning direction) by laser beam scanning, correct printing cannot be done. It is to overcome this problem that the direction of bits forming each intermediate code must be rotated by 90° by the rotator 16 before the bit arrays are delivered to the printing mechanism 17. FIG. 5(c) shows such rotation. In FIG. 5(c), the direction of bits forming the intermediate codes extends parallel to the main scanning direction, which thus allows correct printing to be implemented.

FIGS. 6(a) to 6(d) presents diagrams showing the directions of bit arrays when the directions of the bit arrays in the respective rectangular blocks have been processed with the rotator 16. FIG. 6(a) shows a change from the sheet forward direction A in FIG. 2 to the sheet forward direction B; FIG. 6(b) shows a change from the sheet forward direction A to the sheet forward direction D; FIG. 6(c) shows a change from the sheet forward direction B to the sheet forward direction A; and FIG. 6(d) shows a change from the sheet forward direction D to the sheet forward direction C. It is suggested that such changing patterns be held in a table or the like in advance. Further, if each of these rectangular blocks is a square and the center of each square block is set as the origin of an address for generating an intermediate code, it is no longer required to recheck to which rectangular block each intermediate code belongs after the intermediate code has been subjected to a rotation process with the rotator 16. Describing this with reference to FIG. 7, it means that the coordinates (a, b) before rotation and the coordinates (–b, a) after rotation are all included in the initial rectangular block. As a result, both processing time and work area can be saved.

Returning to FIG. 4, if an error is not caused by the erroneous sheet direction (S107: No) in the error cause judging process (S107), the main control section 19 gives the operator a message indicating occurrence of the error and a message prompting the operator to remove such error and waits (S111). If the error has been removed after a predetermined time has elapsed, or if a resume instruction has been inputted by the operator (S112: Yes), then the main control section 19 permits the image forming process for a next page to be executed; i.e., the main control section 19 allows the actual image forming section 14 to generate actual image data and the printing mechanism 17 to print the generated actual image data.

When the main control section 19 has executed the process steps after S106 and onwards for all the pages, and if there is no next print job (S114: No), or when an error has occurred but has not been removed within the waiting time (S112: No), then the main control section 19 ends the process.

As described above, when executing the image forming process, the page printer 1 according to the present mode of embodiment generates intermediate codes on a square block basis, constructs virtual bands by arranging the intermediate codes in either one of the directions, lengthwise or widthwise, and if the direction of the page is changed, the page printer 1 reconstructs the virtual bands extending in the opposite direction by changing the direction of arraying the intermediate codes being generated. Therefore, when an error occurs, there is no need for regenerating the intermediate codes as in the conventional example. Further, since the length of a single side of the square is the same as the length of a short side of the virtual band, virtual bands can be constructed or reconstructed only by simply arranging square block-based intermediate codes.

When sheets of a size can be arranged in two different directions (there are two sheet feed trays), even if sheets arranged in one direction run out during printing, sheets arranged in the other direction can be used to automatically print as a result of the aforementioned function according to the present mode of embodiment. Further, if, e.g., there is a single sheet feed tray and a single sheet discharge tray, appropriate printing can be done either by checking the sheet direction at the start of printing and automatically switching the direction of virtual bands in accordance with the checked direction, or by judging the shape of the specified sheet feed tray and automatically switching the direction of virtual bands in accordance with the result of the judgment.

Still further, according to the present mode of embodiment, in the case of a page printer having two sheet feed trays and a single sheet discharge tray, printed sheets can be sorted by adding an instruction analogous to output data from the sheet direction detecting section 18 per print job or per predetermined number of pieces of print data, and by printing and discharging the sheets while automatically changing the directions of sheets. As a result, utilization of the page printer can be significantly improved.

In the end, an image forming apparatus that can support both sheet arranging directions, lengthwise and widthwise, can be implemented with ease as a result of the present invention.

It is advantageous in changing the direction of an intermediate code if the rectangular block is made square and the center of the square block is set as the origin of the intermediate code as in the present mode of embodiment. However, the rectangular block is not necessarily made square; other shapes can be selected by separately arranging operation means. In this case, the rectangular block may be made oblong and the lengths of the sides of the oblong block may be set so that the capacities of two virtual bands whose arraying directions are different from each other are the same. In addition, the rectangular block forming order shown in FIG. 2 may, of course, be arbitrary.

Still further, the aforementioned description may be similarly applied to all apparatuses that execute the image forming process using intermediate codes such as digital copying machines.

As is apparent from the foregoing, the present invention can flexibly take care of changes in the size and direction of an image forming area.

What is claimed is:

1. A method of forming an image to be printed on a printer comprising the steps of:
   generating intermediate codes corresponding to a print job on a rectangular block basis;
   arranging a plurality of rectangular blocks of the intermediate codes in either a lengthwise direction or a widthwise direction of an image forming area so as to construct virtual bands having a predetermined width and extending in one of the lengthwise direction and the widthwise direction, wherein the rectangular blocks are square;
   developing the intermediate codes into bit images on a virtual band basis so as to form an image, wherein a length of a side of each of the squares is the same as a length of a short side of each of the virtual bands; and
   reconstructing the virtual bands so as to extend in the other of the lengthwise direction and the widthwise direction by changing a direction in which to generate bits forming the intermediate code within each rectangular block when a direction of the image forming area is changed to the other direction.

2. The image forming method according to claim 1, wherein centers of the squares are set as an origin for generating the intermediate code.

3. The image forming method according to claim 1, wherein said reconstructing step includes the step of rotating the direction in which to generate bits forming the intermediate code by 90°.

4. An apparatus for forming an image to be printed on a printer comprising:
   first means for generating intermediate codes corresponding to a print job on a rectangular block basis and grouping the intermediate codes into virtual bands within the respective generated rectangular blocks by arranging the intermediate codes in one of a lengthwise direction and a widthwise direction, wherein the rectangular blocks are square and a length of a side of each of the squares is the same as a length of a short side of each of the virtual bands;
   second means for forming an image by developing the generated intermediate codes into bit images on a virtual band basis; and
   third means for changing a direction in which to generate bits forming the intermediate code within each rectangular block to the other of the lengthwise direction and the widthwise direction upon reception of an instruction.

5. The image forming apparatus according to claim 4, further comprising fourth means for reconstructing a group of the rectangular blocks determining a direction of an image forming area when the instruction for changing an arrangement direction of an image forming medium has been detected, and instructing to change a direction in which to generate bits forming an intermediate code within each rectangular block to the other direction.

6. The image forming apparatus according to claim 4, wherein centers of the squares are set as an origin for generating the intermediate code.

7. The image forming apparatus according to claim 5, wherein centers of the squares are set as an origin for generating the intermediate code.

8. A computer program product readable by a computer and executable with a computer, comprising program code means of:
   first code means for generating intermediate codes corresponding to a print job on a rectangular block basis and grouping the intermediate codes into virtual bands within the respective generated rectangular blocks by arranging the intermediate codes in one of a lengthwise direction and a widthwise direction, wherein the rectangular blocks are square and a length of a side of each of the squares is the same as a length of a short side of each of the virtual bands;
   second code means for forming an image by developing the generated intermediate codes into bit images on a virtual band basis;
   third code means for changing a direction in which to generate bits forming the intermediate code within each rectangular block to the other of the lengthwise direction and the widthwise direction upon reception of an instruction; and
   fourth code means for reconstructing groups of the intermediate codes when the instruction for changing an arrangement direction of an image forming medium has been detected, and sending the third code means the instruction.

9. The computer program product according to claim 8, wherein centers of the square are set as an origin for generating the intermediate codes.

* * * * *